Jan. 27, 1931.　　　F. E. TURNER　　　1,790,030
ELEVATOR BRAKE CONTROL
Filed Dec. 19, 1928
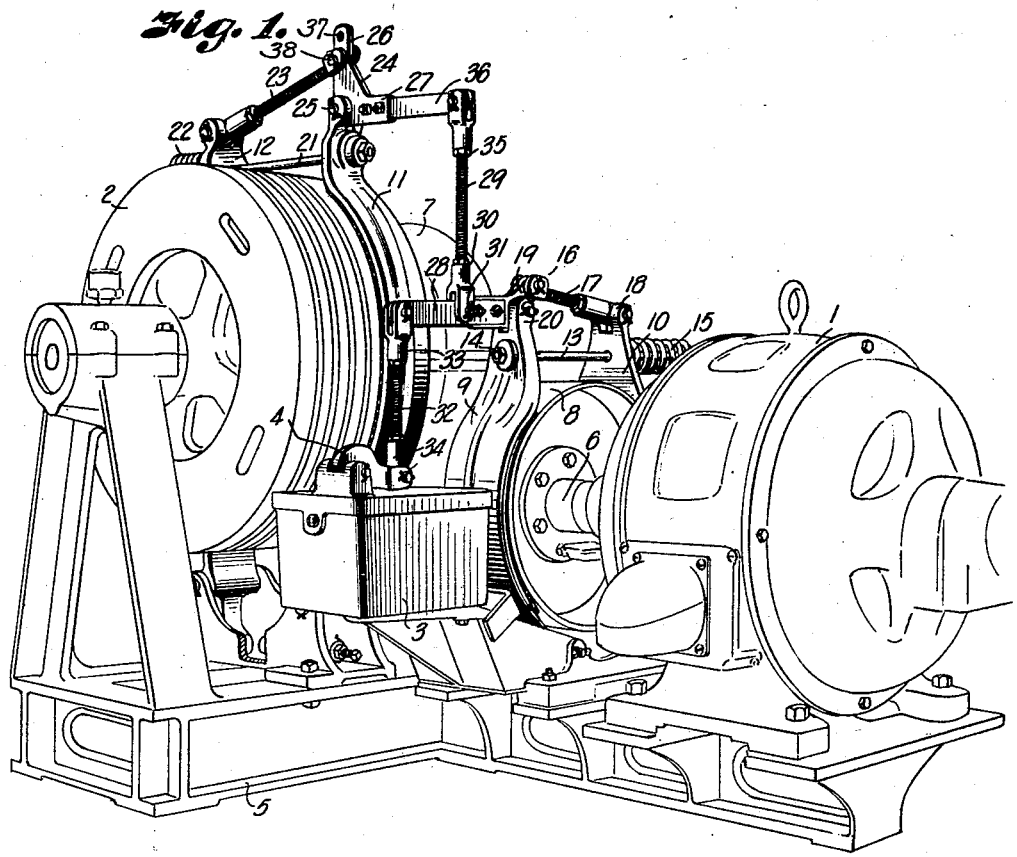
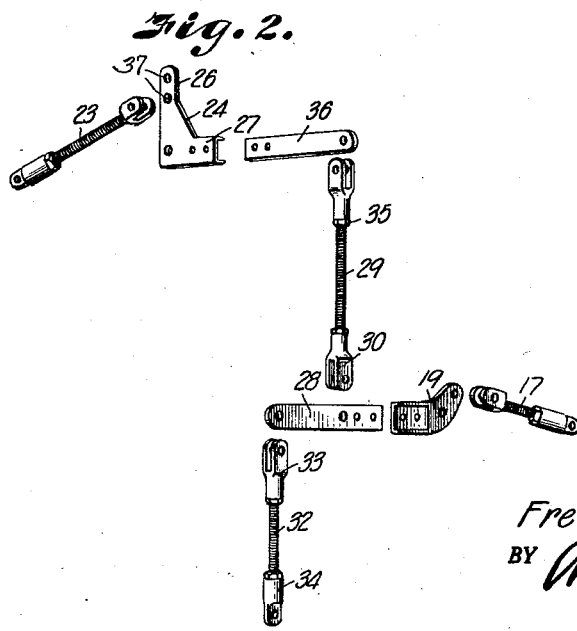
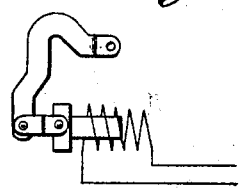
INVENTOR.
Frederick E. Turner
BY
ATTORNEY Patented Jan. 27, 1931

1,790,030

UNITED STATES PATENT OFFICE

FREDERICK E. TURNER, OF KANSAS CITY, MISSOURI

ELEVATOR-BRAKE CONTROL

Application filed December 19, 1928. Serial No. 327,088.

My invention relates to transmissions for elevators and more particularly to brakes for controlling said transmissions, the principal objects of the invention being to operate a plurality of brakes from a common source, to operate the brakes coincidently and to provide for adjustment of the several brake-operating members for accurate functioning under the influence of the common operating means.

In accomplishing these and other objects of the invention, I have provided improved details of structure, the preferred forms of which are illustrated in the accompanying drawings, wherein:

Fig. 1 is a perspective view of elevator-operating mechanism including brake shoes and means embodying my invention for controlling the brakes.

Fig. 2 is an enlarged perspective view of members of the brake controlled mechanism shown separated.

Fig. 3 is an elevation of the solenoid and brake controlling lever.

Referring in detail to the drawings:

1 designates a motor, 2 a traction sheave and 3 a brake pot containing a solenoid or magnet for operating a brake controlling lever 4 pivotally supported by the pot, the motor sheave and pot being supported on a base frame 5 and comprising well known elements of an elevator machine.

A shaft 6 extends into a worm gear housing 7 and is operatively connected with the sheave for rotating the same. A pulley 8 fixed to the shaft carries a brake drum and a brake shoe comprising hinged halves 9 and 10 is adapted for frictionally engaging the pulley to control the motor while a similar shoe comprising hinged halves 11 and 12 is frictionally engageable with the sheave to control the same.

A rod 13 extending in openings of the brake shoe members 9 and 10 is anchored by a nut 14 on the outer face of the member 9 and a spring 15 bearing against the opposite end of the rod and the other member of the brake shoe tends to urge the hinged members together to frictionally engage the pulley for normally restraining the pulley against rotation. The shoe members are urged apart against the influence of the spring by a jointed lever 16 comprising a longitudinally adjustable rod 17 pivotally mounted between ears 18 on one of the brake shoe members and on arcuate lever 19 pivotally mounted between ears 20 on the other brake shoe member and pivotally connected with the rod 17, whereby pivoting of the member 19 will cause the jointed lever to move toward straight position to separate the shoe members and release the shoes from the pulley.

A similar brake control device is mounted on the brake shoe members for controlling the traction sheave including a rod 21 slidable in openings in the brake shoe members, a spring 22 normally holding the shoes in frictional engagement with the sheave, a longitudinally adjustable rod 23 pivotally mounted in the member 12 and a bell crank lever 24 pivotally mounted in the member 11 on a fulcrum 25 and including an arm 26 on which the outer end of the rod 23 is pivoted, and an arm 27 extending right-angularly to the first named arm which may be operated to rotate the member 24 and separate the brake shoe members against the influence of the spring 22.

I provide means for operating the levers 16 and 24, comprising a bar 28 having its outer end secured to the lever arm of the pulley control lever 16, a longitudinally adjustable rod 29 including a clevis 30 pivotally mounted on a pin 31 extending centrally and transversely in the bar, and a longitudinally adjustable operating rod 32 including a clevis 33 pivotally connected to the outer end of the bar and a socket member 34 pivotally mounted in the outer end of the lever 4. Each of the rods includes a threaded bolt on which the clevis and socket members are threaded.

The rods 17, 23, 29 and 32 may be adjusted as to length by removing the clevis and socket members from the supports and rotating them over the threaded bolts, the rods being set in readjusted position by lock nuts such as 35.

The arm 27 of the lever 24 is preferably elongated for my special purpose, by mounting thereon a bar 36 and pivotally mounting the rod 29 on the outer end of said bar, whereby the arm 27 may extend outwardly from the sheave for positioning the rod 29 for mounting the clevis of the same on the bar 28 that is secured to the operating arm of the lever 16. The arm 26 of the bell crank lever is provided with a plurality of openings such as 37, for selectively receiving the pivot pin 38 of the rod 23, for adjusting the leverage of said lever.

In operating the device, the brake shoes are normally frictionally engaged with the pulley and traction sheave, respectively, and energization of the magnet will cause the lever 4 to move in an anti-clockwise direction in the illustrated structure to move the rod 32 for raising the horizontal bar 28. The raising of the bar 28 coincidently causes the operation of the lever 24 to move the shoe members 11 and 12 apart for releasing the traction sheave and the operation of the operating lever arm of the jointed lever 16 to move the brake shoe members 9 and 10 apart against the influence of the spring 15 for releasing the pulley. The adjustable rods may be shortened or lengthened for effecting coincident operation of the several members. For example, the jointed lever of the pulley control device may be adjusted consequently on changed frictional conditions to permit the lever to operate the brake shoe members for the desired result without affecting the adjustment of the sheave control members and the relation of the same to the reciprocating rod operated by the magnet lever 4.

What I claim and desire to secure by Letters Patent is:

1. In a device of the character described including a plurality of sets of brake shoes and an operating lever for each set of shoes, a bar connected with one of the levers, an adjustable rod pivotally connected with the other lever and with said bar, an adjustable rod pivotally connected with said bar, and means for reciprocating the last named rod.

2. In combination with elevator operating mechanism including a cable, a sheave, a driving shaft having driving connection with the sheave, a brake for the shaft, and a lever for controlling the brake, a brake on the sheave controlled by said lever.

3. In combination with elevator operating mechanism including a driving shaft, a traction drum in driven relation with the driving shaft, a brake for controlling the driving shaft, a lever for controlling said brake, and a brake for the drum, means connecting the drum brake with the lever for enabling said lever to control the drum brake.

4. In combination with elevator operating mechanism including a driving shaft and a traction drum, brake shoes engageable respectively with the driving shaft and the traction drum, and means including a solenoid and a member controlled by the solenoid for controlling the shaft brake shoes, means controlled by said member for controlling the drum brake shoes.

5. In elevator apparatus including driving means, a traction drum in constant driven relation with the driving means, means for braking the driving means, means including a lever for rendering the braking means effective, and a brake for the drum, means operable by said lever for rendering the drum brake effective.

6. In elevator apparatus including a motor, a shaft driven by the motor, a traction drum in constant driven relation with the shaft, brake shoes for braking the shaft, a spring for operating the shaft shoes, means operating against the spring to hold the shaft shoes in open position, and means for releasing the holding means, brake shoes for the traction drum, a spring for operating the drum shoes, and means operable by the shaft shoe holding means.

7. In apparatus of the character described, including a motor, a circuit for energizing the motor, a drive shaft, a worm on the shaft, a worm wheel, a traction drum operably connected with said wheel, a spring-operated brake shoe for stopping the drive shaft when the circuit to the motor is broken, means including a solenoid in said circuit and a lever operable by the solenoid and operating against the influence of said spring to hold the brake shoe in open position, a brake shoe for the drum, a spring for operating the drum shoe, and means controlled by said lever for holding the drum shoe in open position.

In testimony whereof I affix my signature.

FREDERICK E. TURNER.